United States Patent
Hsu et al.

(10) Patent No.: US 6,417,938 B1
(45) Date of Patent: Jul. 9, 2002

(54) COLOR IMAGE SCANNING METHOD OF A COLOR IMAGE SCANNER

(75) Inventors: Chuan-Yu Hsu, Hsin-Chu Hsien; Chen-Ho Lee, Yun-Lin Hsien, both of (TW)

(73) Assignee: UMX Data Systems Inc., Hsin-Chu (TW)

( * ) Notice: Subject to any disclaimer, the term of this patent is extended or adjusted under 35 U.S.C. 154(b) by 0 days.

(21) Appl. No.: 09/303,679

(22) Filed: May 3, 1999

(30) Foreign Application Priority Data

Jan. 8, 1999 (TW) ........................................ 88100223 A (51) Int. Cl.[7] ................................................ H04N 1/46
(52) U.S. Cl. ...................................... 358/509; 358/504
(58) Field of Search ................................ 358/504, 509, 358/505, 506, 520, 523, 1.1, 475, 406, 487, 462; 250/208.1, 234–236, 559.1; 362/800; 399/4, 184, 198, 220

(56) References Cited

U.S. PATENT DOCUMENTS

| | | | | |
|---|---|---|---|---|
| 5,696,608 A | * | 12/1997 | Matsuo et al. ............... | 358/475 |
| 5,721,623 A | * | 2/1998 | Boxma ........................ | 358/448 |
| 5,745,262 A | * | 4/1998 | Tatsumi ...................... | 358/504 |
| 6,011,906 A | * | 1/2000 | Muroki et al. ............... | 358/406 |
| 6,118,557 A | * | 9/2000 | Sugiyama et al. .......... | 358/504 |
| 6,172,771 B1 | * | 1/2001 | Ikeda et al. ................. | 358/406 |
| 6,222,934 B1 | * | 4/2001 | Tsai ............................ | 382/112 |
| 6,275,309 B1 | * | 8/2001 | Hu et al. ..................... | 358/473 |
| 6,320,668 B1 | * | 11/2001 | Klm ............................ | 358/1.1 |

\* cited by examiner

Primary Examiner—Cheukfan Lee
(74) Attorney, Agent, or Firm—Winston Hsu (57) ABSTRACT

The present invention provides a color image scanning method of a color image scanner. The scanner comprises three light sources for emitting three different colored lights to illuminate a document to be scanned, and a scanning module for scanning the lights transmitted from the document to generate scanned color image signals of the document. The method comprises: (1) using each of the three light sources and the scanning module to scan a color calibration document to obtain three sets of scanned color image signals of the color calibration document, where three sets of final color image signals of the color calibration document are known, (2) using the three sets of scanned color image signals and final color image signals of the color calibration document to calculate three sets of color calibration parameters for calibrating the three light sources, each set of color calibration parameters comprising three color calibration parameters for calibrating the three light sources to obtain one set of final color image signals, and (3) using each of the three sets of color calibration parameters to adjust the three light sources when scanning the document so as to obtain three sets of final color image signals of the document.

9 Claims, 7 Drawing Sheets

COLOR IMAGE SCANNING METHOD OF A COLOR IMAGE SCANNER

BACKGROUND OF THE INVENTION

1. Field of the invention

The present invention relates to a color image scanner, and more particularly, to a color image scanning method of a color image scanner.

2. Description of the Prior Art

Figure 1:
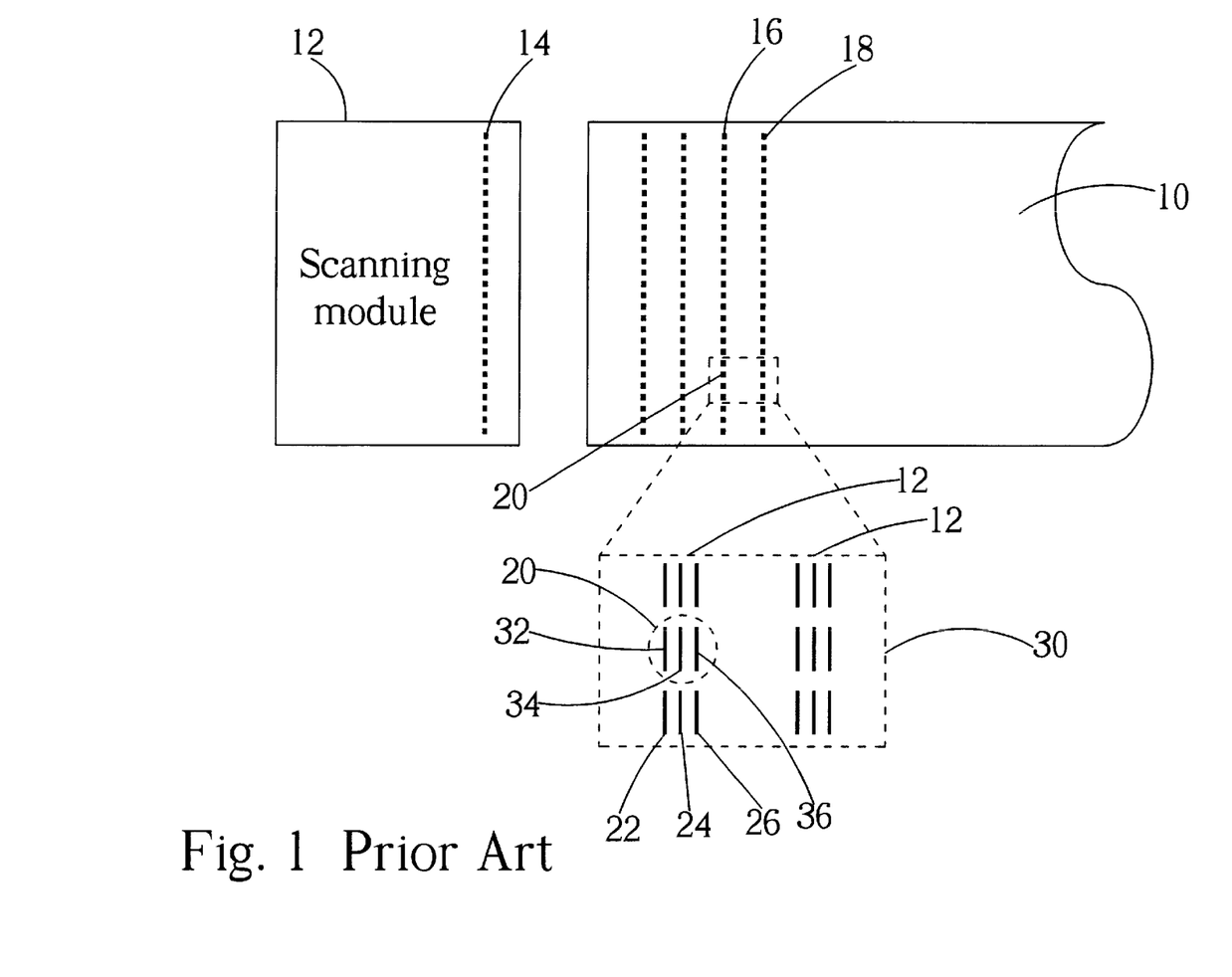
FIG. 1 is a perspective view of image scanning lines of a document.

Please refer to FIG. 1. FIG. 1 is a perspective view of image scanning lines 16, 18 of a document 10. The scanning module 12 comprises a plurality of light sensors 14 arranged in a linear manner that are used to scan a document 10. The scanning module 12 scans the document 10 to sequentially produce image scanning lines 16, 18. In this way, a document image is formed. Each scanning line 16, 18 comprises a plurality of scanning dots that correspond to the output of the sensors 14. The inset denoted by a dotted square 30 shows an enlarged view of scanning lines 16, 18. The square 30 indicates that each scanning line 16, 18 has red image, green image, and blue image lines 22, 24, and 26. Although each of these image lines is close to each other, they are not precisely coincident. This is because the scanning module 12 advances at a constant speed and motion as it takes samples. This results in varying positions of each sample. The result is that each scanning point 20 of the scanning line 16 in effect comprises red, green and blue scanning points 32, 34, and 36. The samples are taken at a much faster speed than the movement of the sensors 14. Therefore, the red, green, and blue scanning points 32, 34, 36 are very close together and are viewed as a scanning point 20 thus forming the image of the scanned document.

Figure 2:
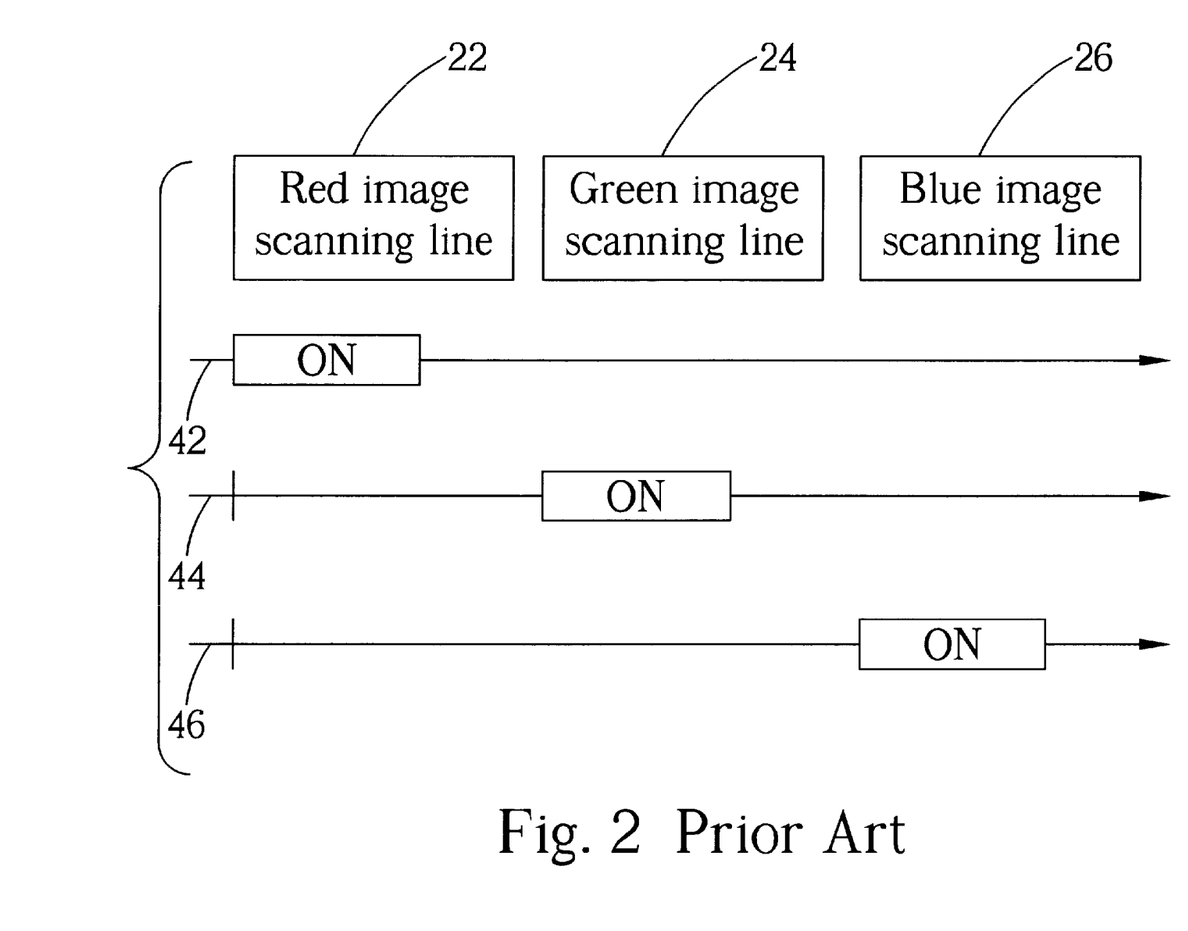
FIG. 2 is a schematic diagram of intensity and time-sequence of three light sources of a prior art color scanner.

Please refer to FIG. 2. FIG. 2 is a schematic diagram of intensity and time-sequence of three light sources 42, 44, 46 of a prior art color scanner. In the prior art the image line of each color is obtained by using the light source of that color. For example, to obtain an image scanning line, the red, green, and blue light sources 42, 44, and 46 are turned on sequentially to produce their respective image lines 22, 24, 26 in sequence. The scanning module 12 is then further driven to complete the scanning of the document 10. There are many methods to calibrate the image scanning line. The first method is to calibrate the image lines 22, 24, 26 before the composed image scanning line is outputted. The second method is to adjust intensities or turn-on periods of the three light sources 42, 44, 46 before scanning is performed. These methods only utilize the light source 42, 44, 46 of each color to obtain the respective image line 22, 24, 26.

SUMMARY OF THE INVENTION

It is therefore a primary objective of the present invention to provide a color image scanning method of a color image scanner to solve the above mentioned problems.

In a preferred embodiment, the present invention provides a color image scanning method of a color image scanner, the scanner comprising three light sources for emitting three different colored lights to illuminate a document to be scanned, and a scanning module for scanning the lights transmitted from the document to generate scanned color image signals of the document, the method comprising:

(1) using each of the three light sources and the scanning module to scan a color calibration document to obtain three sets of scanned color image signals of the color calibration document, where three sets of final color image signals of the color calibration document are known;

(2) using the three sets of scanned color image signals and final color image signals of the color calibration document to calculate three sets of color calibration parameters for calibrating the three light sources, each set of color calibration parameters comprising three color calibration parameters for calibrating the three light sources to obtain one set of final color image signals; and (3) using each of the three sets of color calibration parameters to adjust the three light sources when scanning the document so as to obtain three sets of final color image signals of the document.

It is an advantage of the present invention that the scanning module scans the document using three light sources while also using calibrating parameters to obtain image scanning lines. Finally, the final scanning image is obtained by combining the image scanning lines.

This and other objectives of the present invention will no doubt become obvious to those of ordinary skill in the art after having read the following detailed description of the preferred embodiment which is illustrated in the various figures and drawings.

DETAILED DESCRIPTION OF THE PREFERRED EMBODIMENT

Figure 3:
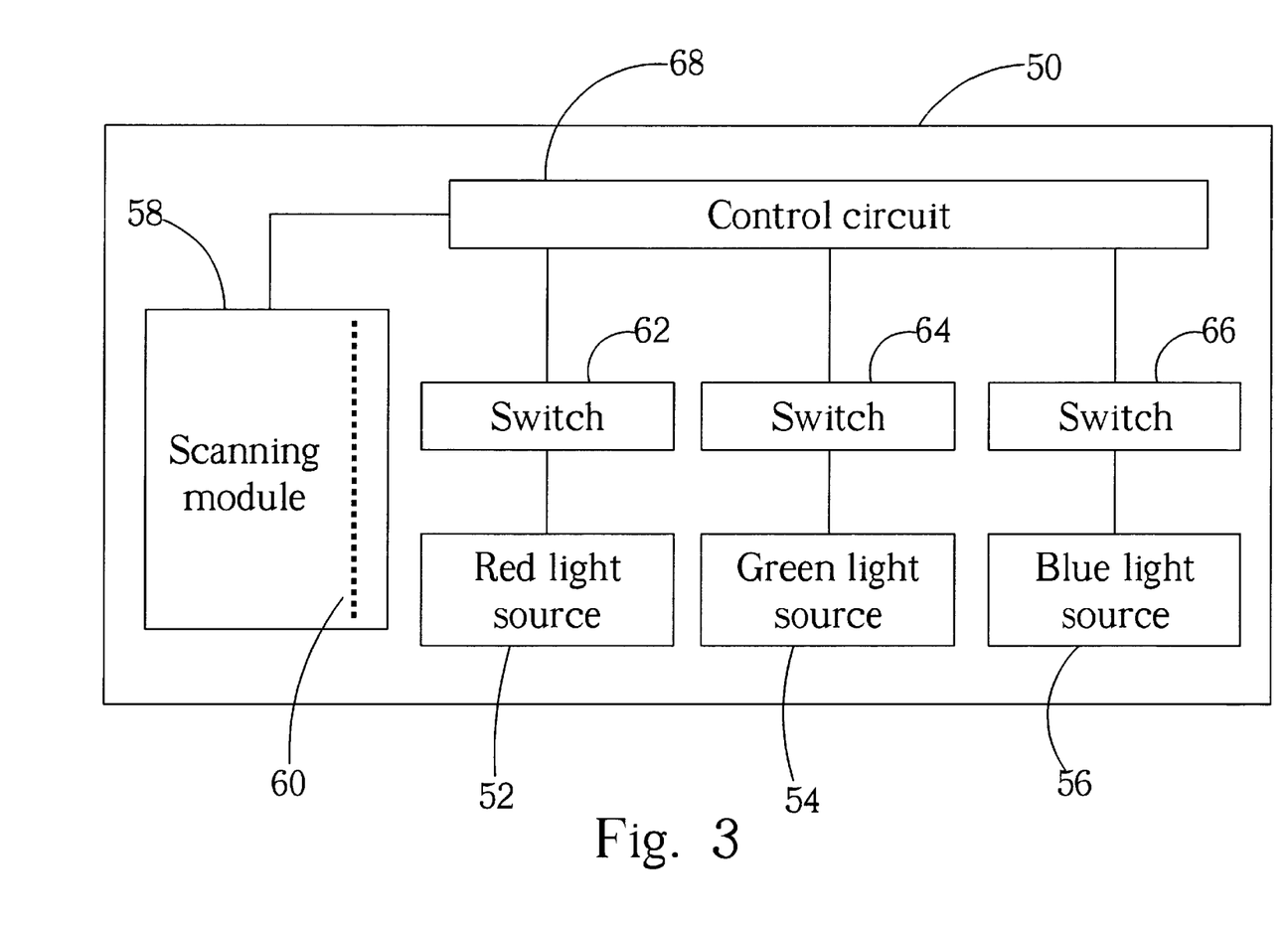
FIG. 3 is a block diagram of a color scanner according to the present invention.

Please refer to FIG. 3. FIG. 3 is a block diagram of a color scanner 50 according to the present invention. The scanner 50 comprises red, green, and blue light sources 52, 54, 56 for emitting red, green and blue lights to illuminate a document to be scanned, a scanning module 58 for scanning the lights transmitted from the document to generate three sets of final color image signals of the document, and a control circuit 68 for controlling the three light sources 52, 54, 56 and the scanning module 58. The scanning module 58 comprises a plurality of linearly arranged light sensors 60 for sensing the light transmitted from each of the three light sources 52, 54, 56. The three light sources 52, 54, 56 are individually connected with the correspondent switches 62, 64, 66. The control circuit 68 controls the three light sources 52, 54, 56 through the three switches 62, 64, 66. The three light sources 52, 54, 56 can be three light emitting diodes of different colors.

The principles of the color image scanning method are herein explained. If the scanner 50 is taken as a system, then the red, green, and blue light sources 52, 54, 56 are inputs of this system (R, G, B) and the three image signals obtained after the scanning module 58 scans the document can be considered outputs of the system (R', G', B'). When adjusting the inputs of the system (R, G, B), the corresponding outputs (R', G', B') can be obtained. The relationship of the inputs and outputs can be written as:

$$\begin{bmatrix} R' \\ G' \\ B' \end{bmatrix} = T * \begin{bmatrix} R \\ G \\ B \end{bmatrix},$$

wherein $$\begin{bmatrix} R \\ G \\ B \end{bmatrix}$$

represents the brightness of the three light sources, and $$\begin{bmatrix} R' \\ G' \\ B' \end{bmatrix}$$

represents the three color image signals outputted by the scanning module 58, T represents a transforming matrix for transforming the brightness of the three light sources into the three color image signals. In other words, R', G', B' are functions of R, G, B such that R'=f (R,G,B), G'=f (R,G,B) and B'=f (R,G,B). Also, R, G, B, R', G', B' are all variables whose values may be altered as needed. When a set of inputs is given as (R,G,B)=(Ro,Go,Bo) to scan a document, the uncalibrated output (R',G',B')=(R'o,G'o,B'o) will not be identical to the colors of the real image of the document (R'c,G'c,B'c) In other words, R'o±R'c, G'o±G'c, and B'o±B'c. However, if the real colors (R'c, G'c, B'c) of a calibration document are known, then the relationship of the real colors (R'c, G'c, B'c) and the inputs (Ro, Go, Bo) can be inferred as follows:

R'c=r1*Ro+r2*Go+r3*Bo,

G'c=g1*Ro+g2*Go+g3*Bo,

B'c=b1*Ro+b2*Go+b3*Bo,

Or in a matrix form:

$$\begin{bmatrix} R'c \\ G'c \\ B'c \end{bmatrix} = \begin{bmatrix} r1 & r2 & r3 \\ g1 & g2 & g3 \\ b1 & b2 & b3 \end{bmatrix} * \begin{bmatrix} Ro \\ Go \\ Bo \end{bmatrix},$$

wherein $$\begin{bmatrix} r1 & r2 & r3 \\ g1 & g2 & g3 \\ b1 & b2 & b3 \end{bmatrix} = T,$$

represents a transforming matrix. The above conditions must be satisfied to obtain the real colors (R'c,G'c,B'c) of the three color image signal (R',G',B') obtained by scanning the calibration document with the scanning module 58. In other words, when obtaining the red image signal, if R'=r1*Ro+ r2*Go+r3*Bo then R'=R'c so the brightness (R,G,B)=(Ro, Go,Bo) of the three light sources 52, 54, 56 must be changed to (R,G,B)=(r1*Ro,r2*Go,r3*Bo); similarly, when obtaining the green image signal, the brightness (R,G,B) must be changed to (g1*Ro,g2*Go,g3*Bo) so that G'=G'c=g1*Ro+ g2*Go+g3*Bo; and when obtaining the blue image signal, the brightness(R,G,B) should be changed to (b1*Ro,b2*Go, b3*Bo) and then B'=B'c,=b1*Ro+b2*Go+b3*Bo. So the three-color calibrated image signal can be obtained from the scanning module and then it can be combined to form the true color image of this calibration document. Similarly these calibration parameters of the three light sources may be used to control the brightness of the three light sources and to scan other documents, then the true-color image signal of the document can be obtained.

In the present invention, the color scanning method of the color scanner 50 comprises the following steps:

(1) Using the three light sources 52, 54, 56 and the scanning module 58 to scan a calibration document to obtain calibrating parameters of the three light sources, for example:

$$T1 = \begin{bmatrix} 0.9 & 0.07 & 0.04 \\ 0.07 & 1.03 & -0.05 \\ -0.03 & -0.04 & 1.04 \end{bmatrix};$$

The true colors of the calibration document R'c, G'c, B'c are as follows:

R'c=0.9Ro+0.07Go+0.04Bo,

G'c=0.07Ro+1.03Go+(−0.05)Bo,

B'c=(−0.03)Ro+(−0.04)Go+1.04Bo.

(2) Using the three light sources 52, 54, 56 and the scanning module 58 to scan a document by either adjusting the individual current passing through each of the three light sources 52, 54, 56 or by adjusting the length of time the light sources are turned on according to the absolute value of the calibration parameters so that the scanning module can generate a correspondent output.

(3) Combining each of the outputted color image signals from the scanning module 58 obtained in step (2) according to the signs (positive or negative) of the corresponding calibrating parameters obtained in step (1) to obtain the corresponding final image signals (R',G',B')=(R'c,G'c,B'c).

The following are four embodiments of the color image scanning method of the present invention. The difference between them is the manner of controlling the three light sources according to each of the three sets of color calibration parameters.

Figure 4:
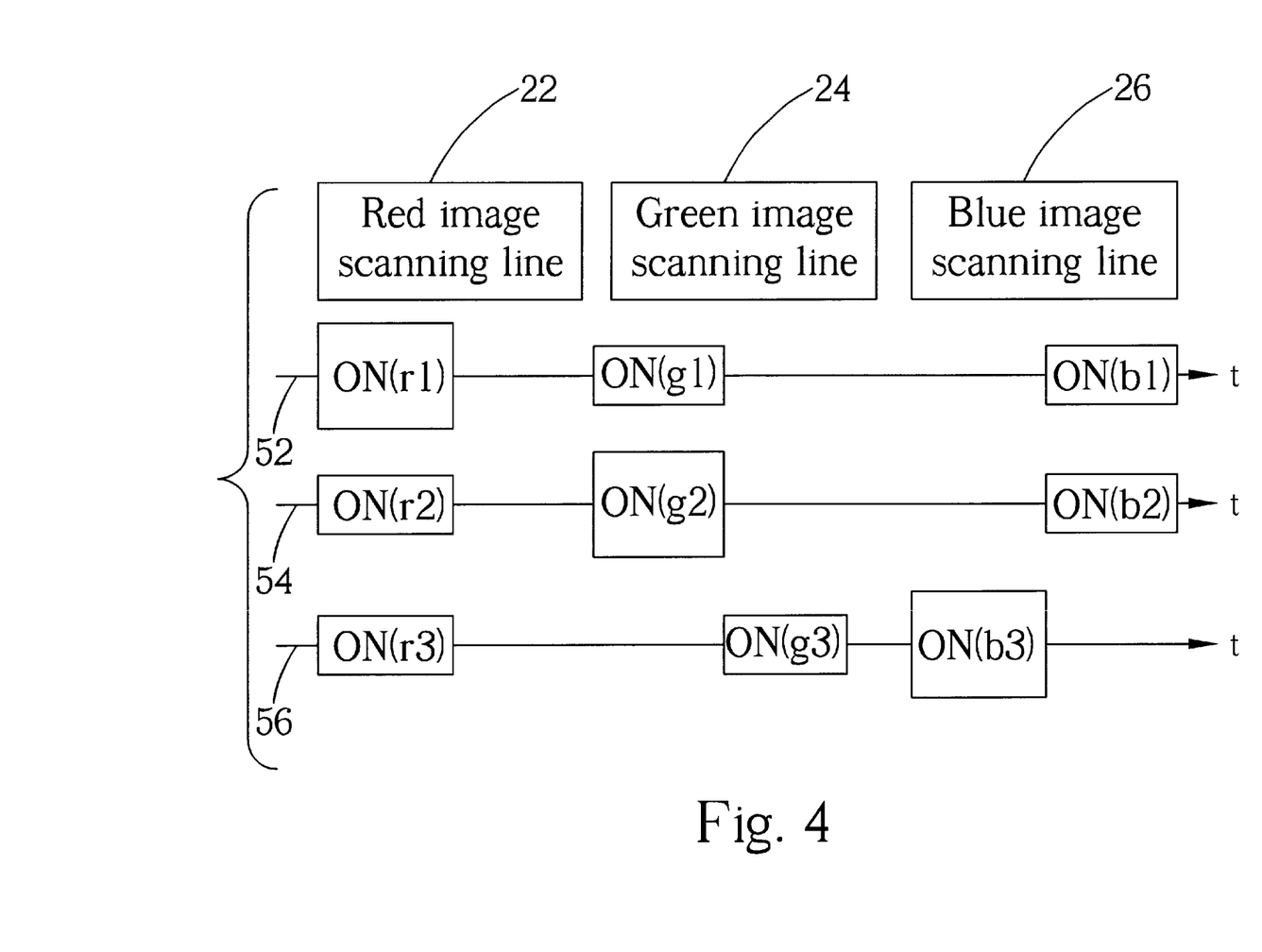
FIG. 4 is a schematic diagram of intensity and time-sequence of three light sources of a color scanner according to the first embodiment of the present invention.

Please refer to FIG. 4. FIG. 4 is a schematic diagram of intensity and time-sequence of three light sources of a color scanner according to the first embodiment of the present invention. In the parameter matrix T1, the red image parameters (r1,r2,r3)=(0.9,0.07,0.04) are all positive whereas the green and blue calibration parameters (g1,g2,g3)=(0.07, 1.03,−0.05) and (b1,b2,b3)=(−0.03,−0.04,1.04) are not all positive. Therefore, when obtaining the red image signal, the control circuit 68 can turn on the three light sources 52, 54, 56 simultaneously and adjust the brightness of the three light sources 52, 54, 56 according to the proportion (0.9Ro, 0.07Go,0.04Bo). This causes the scanning module 58 to directly output the red image signal. When obtaining the green image signal, the control circuit 68 turns on the red light source 52 and green light source 54 according to the proportion (0.07Ro,1.03Go) to control its individual brightness. The scanning module can thus generate a first image signal output G'c1=0.07Ro+1.03Go. The control circuit 68 subsequently turns on the blue light source 56 according to the proportion (0.05Bo) so that the scanning module can generate a second image signal output G'c2=0.05Bo. Then, the second image signal output G'c2 is subtracted from the first image signal output G'c1 to obtain a result of G'c=G'c1−G'c2=0.07Ro+1.03Go+(−0.05)Bo and to produce the green image signal. Similarly, the blue image signal can likewise be obtained as follows B'c=B'c1−B'c2=(−0.03)Ro+(−0.04)Go+1.04Bo.

Figure 5:
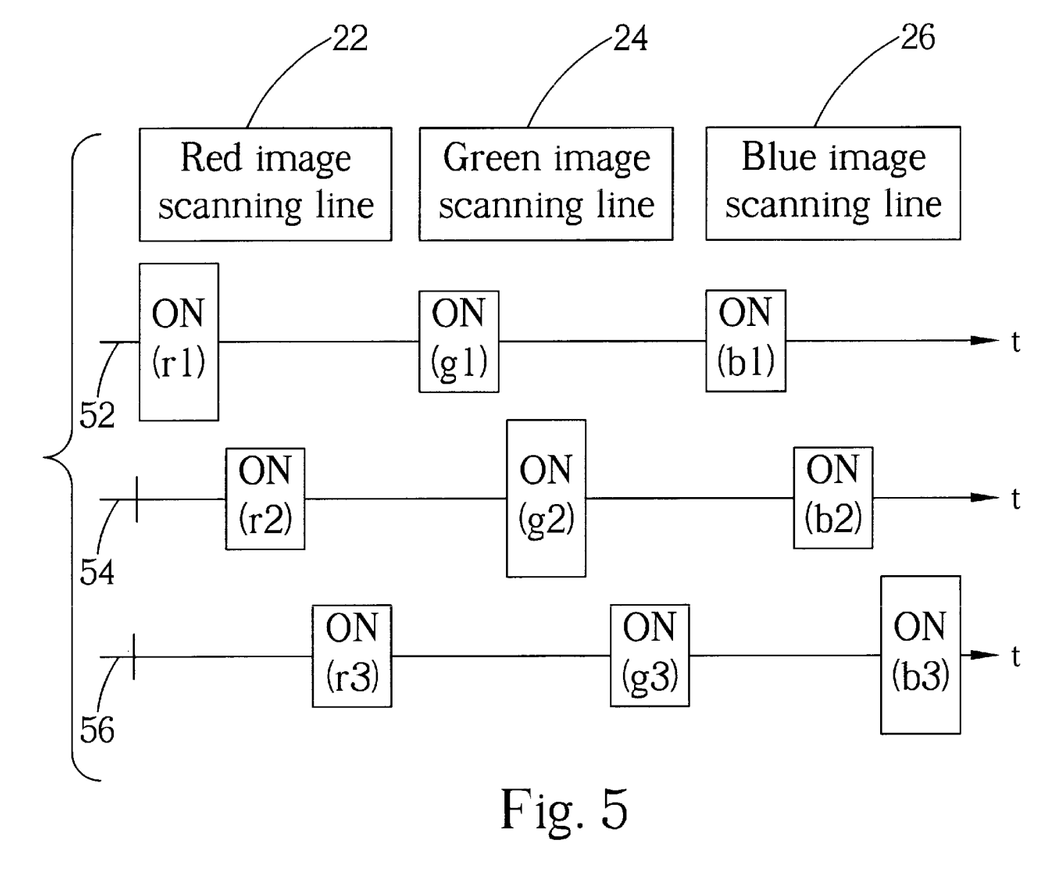
FIG. 5 is a schematic diagram of intensity and time-sequence of three light sources of a color scanner according to the second embodiment of the present invention.

Please refer to FIG. 5. FIG. 5 is a schematic diagram of intensity and time-sequence of three light sources of a color scanner according to the second embodiment of the present invention. When adjusting the three light sources 52, 54, 56 by using the three color calibration parameters contained in one set, the control circuit 68 uses each color calibration parameter to adjust the electrical current passed to the corresponding light source so as to control its brightness. The control circuit 68 turns on the three light sources 52, 54, 56 in turn and adjusts the currents passing through them according to the absolute value of each of the three sets of color calibration parameters (0.9Ro,0.07Go,0.04Bo), (0.07Ro,1.03Go,0.05Bo), and (0.03Ro,0.04Go,1.04Bo) to obtain the output of the scanning module 58. In FIG. 5, the different height of each of the rectangles represents the different brightness of each of the light sources due to differences in current flow. The control circuit 68 then combines the sequential outputs of the scanning module 58 according to the signs of the calibrating parameters to obtain R'c=0.9Ro+0.07Go+0.04Bo, G'c=0.07Ro+1.03Go+(−0.05)Bo, B'c=(−0.03) Ro+(−0.04)Go+1.04Bo. These are the three color image signals of the document.

Figure 6:
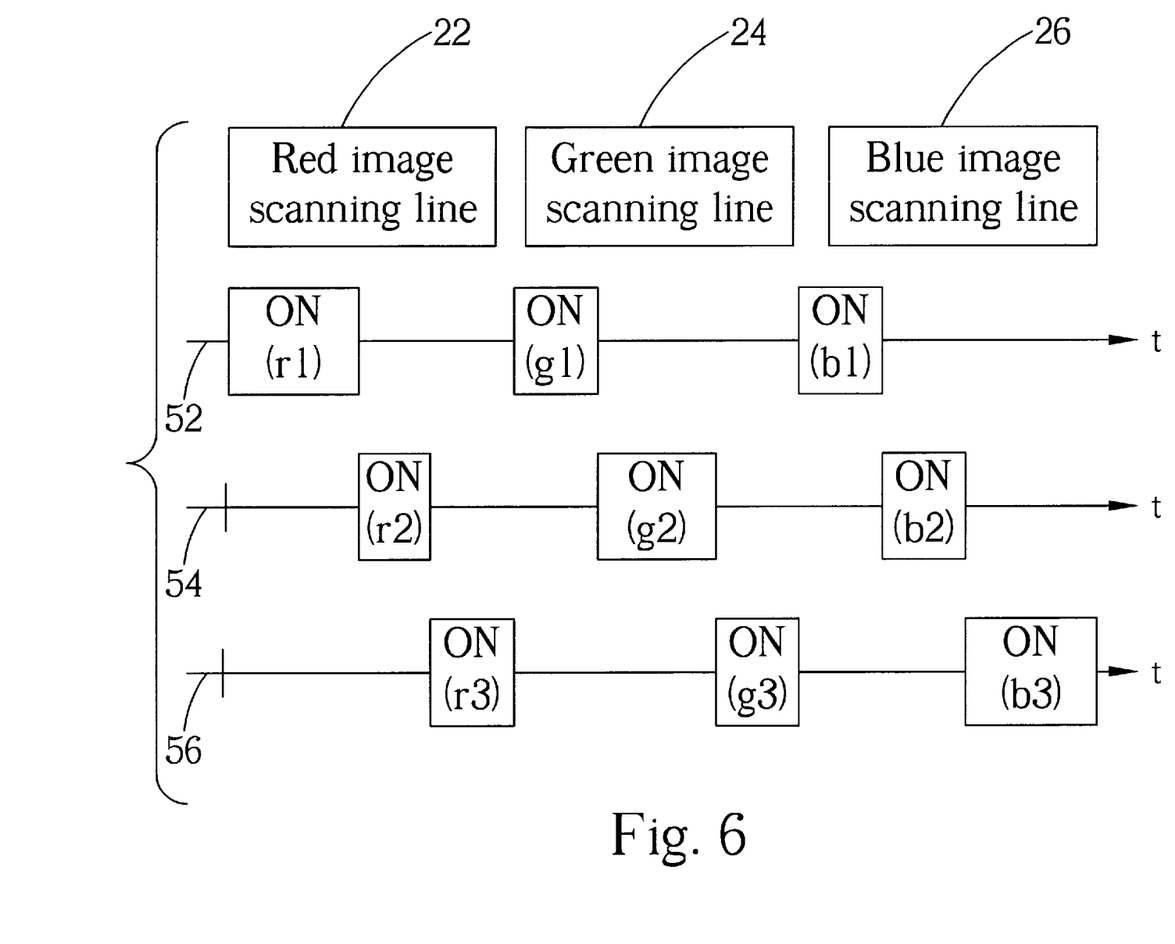
FIG. 6 is a schematic diagram of "on" time and time-sequence of three light sources of a color scanner according to the third embodiment of the present invention.

Please refer to FIG. 6. FIG. 6 is a schematic diagram of "on" time and time-sequence of three light sources of a color scanner according to the third embodiment of the present invention. Similar to the second embodiment, the control circuit 68 sequentially turns on the three light sources 52, 54, 56. However, in this scheme, the period of time that the light sources are turned on is adjusted according to the absolute value of the calibrating parameters (0.9Ro,0.07Go,0.04Bo), (0.07Ro,1.03Go,0.05Bo), and (0.03Ro,0.04Go,1.04Bo) to obtain the corresponding outputs of the scanning module 58. In FIG. 6, the rectangles of different lengths represent different lengths of time the light sources are turned on. The control circuit 68 then combines the sequential outputs of the scanning module 58 according to the signs of the calibrating parameters to obtain R'c=0.9Ro+0.07Go+ 0.04Bo, G'c=0.07Ro+1.03Go+(−0.05)Bo, B'c=(−0.03)Ro+ (−0.04)Go+1.04Bo. These are the three color image signals of the document.

Figure 7:
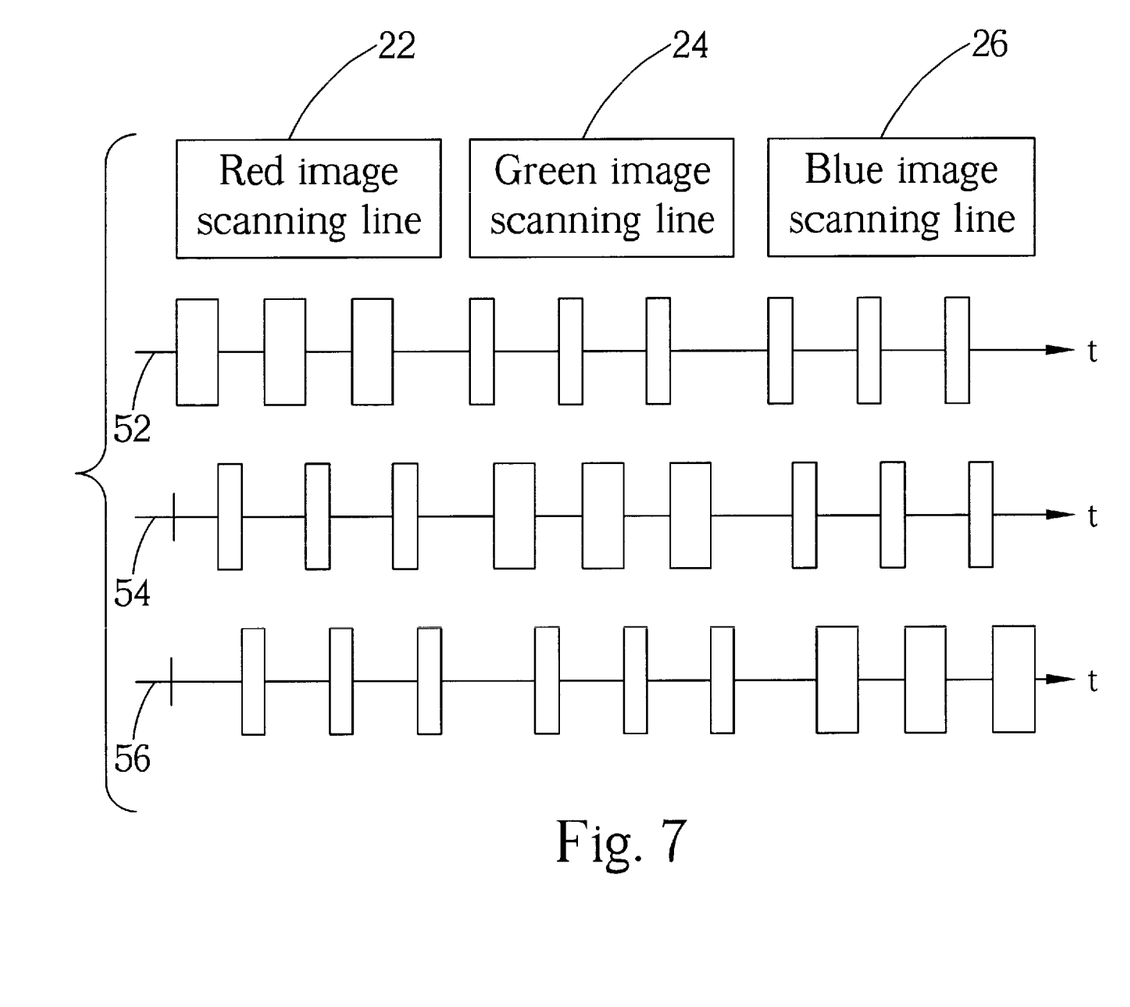
FIG. 7 is a schematic diagram of "on" time and time-sequence of three light sources of a color scanner according to the fourth embodiment of the present invention.

Please refer to FIG. 7. FIG. 7 is a schematic diagram of "on" time and time-sequence of three light sources of a color scanner according to the fourth embodiment of thee present invention. Similar to the third embodiment, the control circuit 68 sequentially turns on the three light sources 52, 54, 56. However, the length of time each light source is turned on is very short and the light sources are turned on and off multiple times while obtaining a color scanning line. The total amount of time the light sources are turned on is proportional to the corresponding calibrating parameter. This allows the scanning module to generate a corresponding output. The control circuit 68 then combines the sequential outputs of the scanning module 58 according to the sign of the calibrating parameters to obtain R'c=0.9Ro+0.07Go+ 0.04Bo, G'c=0.07Ro+1.03Go+(−0.05)Bo, B'c=(−0.03)Ro+ (−0.04)Go+1.04Bo. These are the three color image signals of the document. The advantage of this method of taking samples in which many samples in each color scanning line is taken is that it achieves uniformity in spacing and promotes accuracy in representation.

In the color image scanning method of the color scanner of the present invention, three sets of color calibration parameters are used to adjust three light sources when scanning the document. Each color scanning line is obtained by the three light sources, and then the three scanning lines are combined into a final image signal.

Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A color image scanning method of a color image scanner, the scanner comprising three light sources for emitting three different colored lights to illuminate a document to be scanned, and a scanning module for scanning the lights transmitted from the document to generate scanned color image signals of the document, the method comprising:

(1) using each of the three light sources and the scanning module to scan a color calibration document to obtain three sets of scanned color image signals of the color calibration document, where three sets of final color image signals of the color calibration document are known;

(2) using the three sets of scanned color image signals and final color image signals of the color calibration document to calculate three sets of color calibration parameters for calibrating the three light sources, each set of color calibration parameters comprising three color calibration parameters for calibrating the three light sources to obtain one set of final color image signals; and (3) using each of the three sets of color calibration parameters to adjust the three light sources when scanning the document so as to obtain three sets of final color image signals of the document.

2. The method of claim 1 wherein the scanner further comprises a control circuit for controlling operations of the three light sources and the scanning module.

3. The method of claim 2 wherein the scanner comprises three switches connected between the three light sources and the controller and the three switches are controlled by the control circuit for turning on and off the three light sources individually.

4. The method of claim 3 wherein when scanning the document to obtain one target set of final color image signals of the document by using one corresponding set of color calibration parameters, if the three color calibration parameters in this set are all positive, the control circuit can turn on the three light sources simultaneously by using the three switches and adjust the three light sources by using the three color calibration parameters of this set to obtain the target set of final color image signals directly.

5. The method of claim 3 wherein when scanning the document to obtain one target set of final color image signals of the document by using one corresponding set of color calibration parameters, if the three color calibration parameters in this set are not all positive, the control circuit can simultaneously turn on and adjust each of the light sources with positive color calibration parameters to obtain a first set of scanned color image signals, and simultaneously turn on and adjust each of the light sources with negative color calibration parameters to obtain a second set of scanned color image signals, and the control circuit calculates the target set of final color image signals by using the first and second sets of scanned color image signals.

6. The method of claim 3 wherein when scanning the document to obtain one target set of final color image signals of the document by using one corresponding set of color calibration parameters, the control circuit sequentially turns on and adjusts each of the light sources by using the corresponding color calibration parameter of each of the light sources to obtain three sets of scanned color image signals, and calculate the target set of final color image signals by using the three sets of scanned color image signals.

7. The method of claim 3 wherein when adjusting the three light sources by using the three color calibration parameter contained in one set, the control circuit uses each color calibration parameter to adjust the electric current passed to the corresponding light source so as to control its brightness.

8. The method of claim 3 wherein when adjusting the three light sources by using the three color calibration parameter contained in one set, the control circuit uses each color calibration parameter to adjust the turn on period of the corresponding light source so as to control its illuminating time.

9. The method of claim 1 wherein the three light sources are red, green and blue light emitting diodes.

* * * * *